(12) United States Patent
Wang et al.

(10) Patent No.: US 11,782,861 B2
(45) Date of Patent: Oct. 10, 2023

(54) EXTENSION MODULE FOR INDEPENDENTLY STORING CALIBRATION DATA, COMPONENT, AND COMPONENT CALIBRATION METHOD

(71) Applicant: Siemens Aktiengesellschaft, Munich (DE)

(72) Inventors: Xiao Bo Wang, Nanjing (CN); Su Ying Song, Nanjing (CN); Ming Liu, Nanjing (CN); Jun Zou, Nanjing (CN)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 17/422,486

(22) PCT Filed: Jan. 24, 2019

(86) PCT No.: PCT/CN2019/073009
§ 371 (c)(1),
(2) Date: Jul. 13, 2021

(87) PCT Pub. No.: WO2020/150971
PCT Pub. Date: Jul. 30, 2020

(65) Prior Publication Data
US 2022/0043766 A1 Feb. 10, 2022

(51) Int. Cl.
*G06F 13/38* (2006.01)
(52) U.S. Cl.
CPC .... *G06F 13/382* (2013.01); *G06F 2213/0016* (2013.01)
(58) Field of Classification Search
CPC ........... G05B 2219/21015; G05B 2219/25301; G05B 2219/1109; G05B 19/042; G05B 19/05; G06F 2213/0016; G06F 13/382
See application file for complete search history.

(56) References Cited

U.S. PATENT DOCUMENTS 6,249,753 B1 * 6/2001 Mason .................... G01D 3/022
702/104
6,532,434 B1 * 3/2003 West ...................... G01D 9/005
702/187
(Continued)

FOREIGN PATENT DOCUMENTS

CN 101105691 A 1/2008
CN 103616845 A 3/2014
(Continued)

OTHER PUBLICATIONS

International Search Report for International Application No. PCT/CN2019/073009 dated Oct. 24, 2019.
(Continued)

*Primary Examiner* — Raymond N Phan
(74) *Attorney, Agent, or Firm* — Harness, Dickey & Pierce, P.L.C.

(57) ABSTRACT

Provided is an extension module for independently storing calibration data, including: a first interface, adapted to receive a first external input signal; a second interface, adapted to output the first output signal of the extension module; a signal processing circuit, connected between the first interface and the second interface; and a first memory, the first memory storing first calibration data, and the first calibration data being associated with the extension module. Furthermore, also provided is a component using the above extension module, and a component calibration method. On the one hand, the extension module of an embodiment may share an ADC sampling circuit on a main module, so that the manufacturing cost of the extension module is reduced. On the other hand, an embodiment can facilitate the replacement of different extension modules for the main module without repeated calibration.

16 Claims, 2 Drawing Sheets

(56) References Cited

U.S. PATENT DOCUMENTS

| | | | |
|---|---|---|---|
| 8,937,842 B2 | 1/2015 | Sheen et al. | |
| 9,379,728 B1* | 6/2016 | Singh | H03M 1/1047 |
| 10,122,373 B2 | 11/2018 | Kim | |
| 11,156,631 B2* | 10/2021 | Thompson | G01C 25/00 |
| 2004/0085234 A1* | 5/2004 | Dempsey | H03M 1/1028 |
| | | | 341/120 |
| 2005/0177678 A1* | 8/2005 | Jamp | G06F 13/385 |
| | | | 711/100 |
| 2006/0212626 A1* | 9/2006 | Ting | G06F 3/0626 |
| | | | 710/74 |
| 2014/0288786 A1 | 9/2014 | Mayser et al. | |
| 2018/0074986 A1 | 3/2018 | Shinto et al. | |
| 2018/0110399 A1* | 4/2018 | Mizukami | A61B 1/07 |

FOREIGN PATENT DOCUMENTS

| | | |
|---|---|---|
| CN | 107819969 A | 3/2018 |
| CN | 108696277 A | 10/2018 |
| CN | 108700666 A | 10/2018 |
| WO | WO 2013083398 A1 | 6/2013 |
| WO | WO 2016086370 A1 | 6/2016 |
| WO | WO 2018029518 A1 | 2/2018 |

OTHER PUBLICATIONS

Written Opinion of the International Searching Authority for International Application No. PCT/CN2019/073009 dated Oct. 24, 2019.

* cited by examiner

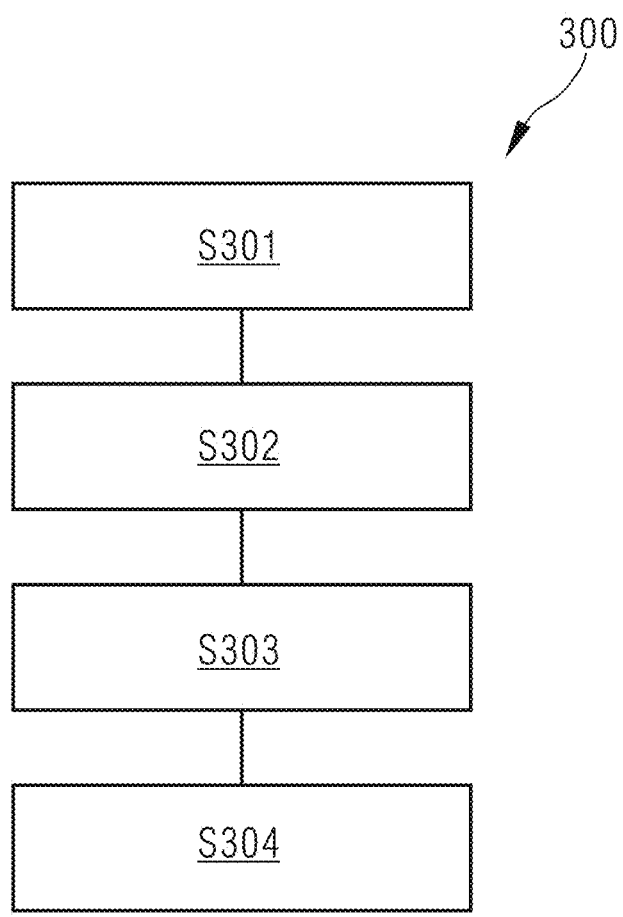

EXTENSION MODULE FOR INDEPENDENTLY STORING CALIBRATION DATA, COMPONENT, AND COMPONENT CALIBRATION METHOD

PRIORITY STATEMENT

This application is the national phase under 35 U.S.C. § 371 of PCT International Application No. PCT/CN2019/073009 which has an International filing date of Jan. 24, 2019, the entire contents of which are hereby incorporated herein by reference.

BACKGROUND

Field

Embodiments of the present application generally relate to an extension module for independently storing calibration data, a component, and a component calibration method.

Background

In the field of industrial motion control, some products need to be designed as main modules to work independently and support an extension module type architecture. The extension module has a plurality of extended channels of analog input or analog output functions. In view of cost reduction, it is hoped that an analog circuit on the extension module shares an ADC sampling circuit on a main module, and only a signal conditioning circuit and a port protection circuit are retained on the extension module.

For example, in the case of analog input, in order to meet the requirements of product analog accuracy, a production line needs to calibrate each product. However, calibration data of the entire loop of each channel is related to the main module, and also related to the extension module. Which board card should store the calibration data becomes a problem. In short, regardless of storage of the calibration data on the main module or on the extension module, the extension module and the main module must be sold in a fixed matching mode. A user cannot replace the extension module with other extension modules of the same model, which is not good for user convenience.

As an alternative, an additional ADC sampling circuit or DAC output circuit is also separately implemented on the extension module, so that the calibration data of an analog channel on the extension module is only related to components on the extension module, and completely independent of the main module. In this case, the calibration data of the extension module may be stored on a memory of the extension module. However, the hardware cost of this alternative is very high.

SUMMARY

In view of the above requirements, at least one embodiment of the present application provides a completely new solution, which makes a component formed by a main module and an extension module share an ADC sampling circuit of the main module, and allows different extension modules to be flexibly switched. Sufficient flexibility can be provided, and manufacturing and usage costs can also be reduced. At least one embodiment of the present application may be applied to various industrial measuring or control devices such as a frequency converter, a PLC, a DCS and various measuring instruments.

According to an embodiment of the present application, an extension module for independently storing calibration data is provided, including:
- a first interface, adapted to receive a first external input signal;
- a second interface, adapted to output a first output signal of the extension module;
- a signal processing circuit, connected between the first interface and the second interface; and
- a first memory, the first memory storing first calibration data, and the first calibration data being associated with the extension module. The independent storage of first calibration data in an extension module helps a main module to replace different extension modules without repeated calibration.

According to another embodiment of the present application, a component calibration method is provided. The component includes a main module and an extension module. The component calibration method includes:
- reading, by a controller of the main module, first calibration data stored in a first memory on the extension module when the component formed by connecting the main module and the extension module to each other is powered on, where the first calibration data is associated with the extension module;
- reading, by the controller of the main module, second calibration data stored in a second memory on the main module, where the second calibration data is associated with the main module;
- combining the first calibration data and the second calibration data to form third calibration data; and
- storing the third calibration data on the main module as calibration data of the component.

According to another embodiment of the present application, a component is provided, including a main module and an extension module.

The extension module further includes:
- a first interface, adapted to receive a first external input signal;
- a second interface, adapted to output the first output signal of the extension module;
- a signal processing circuit, connected between the first interface and the second interface; and
- a first memory, the first memory storing first calibration data, and the first calibration data being associated with the extension module.

The main module further includes:
- a third interface, adapted to be butted with the second interface of the extension module;
- a second memory, the second memory storing second calibration data, and the second calibration data being associated with the main module; and
- a controller, adapted to communicate with the first memory of the extension module to read the first calibration data.

BRIEF DESCRIPTION OF THE DRAWINGS

The accompanying drawings are included to provide a further understanding of the present invention. The accompanying drawings are included to form a part of the present application, show embodiments of the present invention, and explain the principles of the present invention together with this specification. In the drawings:

FIG. 2 shows a flowchart of an embodiment of a component calibration method according to the present application.

DESCRIPTION OF THE REFERENCE NUMERALS

Figure 1:
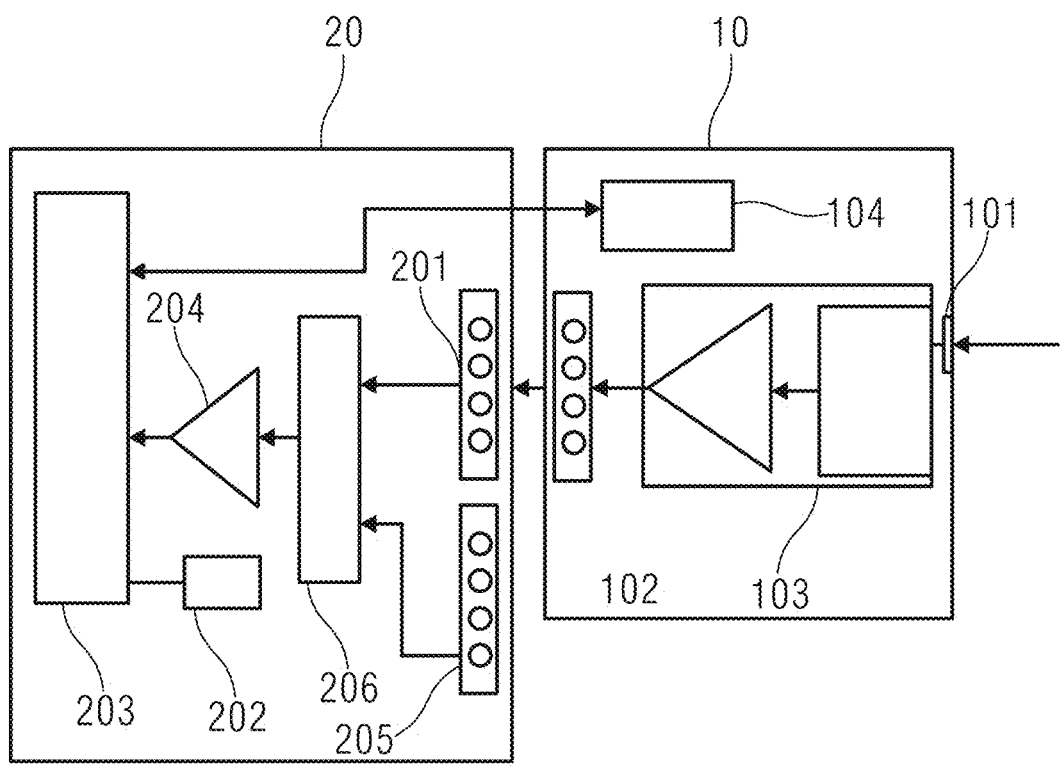
FIG. 1 shows a block diagram of an embodiment of a component according to the present application.

10 Extension module
101 First interface
102 Second interface
103 Signal processing circuit
104 First memory
Main module
201 Third interface
202 Second memory
203 Controller
204 ADC sampling circuit
205 Fourth interface
206 Multiplexer

DETAILED DESCRIPTION OF THE EXAMPLE EMBODIMENTS

According to an embodiment of the present application, an extension module for independently storing calibration data is provided, including:
  a first interface, adapted to receive a first external input signal;
  a second interface, adapted to output a first output signal of the extension module;
  a signal processing circuit, connected between the first interface and the second interface; and
  a first memory, the first memory storing first calibration data, and the first calibration data being associated with the extension module. The independent storage of first calibration data in an extension module helps a main module to replace different extension modules without repeated calibration.

According to one embodiment of the present application, in the above extension module, the first calibration data includes at least a gain of the extension module and an offset of the extension module.

According to one embodiment of the present application, in the above extension module, a conversion relationship between the first input signal and the first output signal of the extension module is linear.

According to another embodiment of the present application, a component is provided, including a main module and an extension module.

The extension module further includes:
  a first interface, adapted to receive a first external input signal;
  a second interface, adapted to output the first output signal of the extension module;
  a signal processing circuit, connected between the first interface and the second interface; and
  a first memory, the first memory storing first calibration data, and the first calibration data being associated with the extension module.
The main module further includes:
  a third interface, adapted to be butted with the second interface of the extension module;
  a second memory, the second memory storing second calibration data, and the second calibration data being associated with the main module; and
  a controller, adapted to communicate with the first memory of the extension module to read the first calibration data.

On the one hand, the extension module of the present application may share an ADC sampling circuit on a main module, so as to reduce the manufacturing cost of the extension module. On the other hand, the present application may facilitate the replacement of different extension modules for the main module without repeated calibration.

According to one embodiment of the present application, in the above component, the main module is further provided with an ADC sampling circuit, and the ADC sampling circuit is shared by the main module and the extension module.

According to one embodiment of the present application, in the above component, the second calibration data includes at least a gain of the main module and an offset of the main module.

According to one embodiment of the present application, in the above component, the main module further includes a fourth interface adapted to receive a second external input signal.

According to one embodiment of the present application, in the above component, a conversion relationship between input signals and output signals of the main module and the extension module is linear.

According to one embodiment of the present application, in the above component, the main module is provided with a fifth interface, and the extension module is provided with a sixth interface corresponding to the fifth interface, where the controller communicates with the first memory of the extension module on the basis of an I2C or SPI communication protocol via the fifth interface and the sixth interface.

According to another embodiment of the present application, a component calibration method is provided. The component includes a main module and an extension module. The component calibration method includes:
  reading, by a controller of the main module, first calibration data stored in a first memory on the extension module when the component formed by connecting the main module and the extension module to each other is powered on, where the first calibration data is associated with the extension module;
  reading, by the controller of the main module, second calibration data stored in a second memory on the main module, where the second calibration data is associated with the main module;
  combining the first calibration data and the second calibration data to form third calibration data; and
  storing the third calibration data on the main module as calibration data of the component.

According to one embodiment of the present application, in the above component calibration method, the first calibration data includes at least a gain of the extension module and an offset of the extension module, and the second calibration data includes at least a gain of the main module and an offset of the main module.

According to one embodiment of the present application, in the above component calibration method, the third calibration data includes a total gain and a total offset, where the total gain is a product of the gain of the extension module and the gain of the main module, and the total offset is the sum of a product of the offset of the extension module and the gain of the main module and the offset of the main module.

According to one embodiment of the present application, in the above component calibration method, a conversion relationship between input signals and output signals of the main module and the extension module is linear.

It will be appreciated that the above general description and the following detailed description of the present application are exemplary and illustrative, and intended to provide a further explanation of the present application as set forth in the claims.

The embodiments of the present application will now be described in detail with reference to the drawings. Reference will now be made in detail to the preferred embodiments of the present application, and examples thereof are shown in the drawings. Wherever possible, the same reference numerals will be used to represent the same or similar parts in all the drawings. Further, although the terms used in the present application are selected from well-known public terms, some of the terms mentioned in the specification of the present invention may be selected by the applicant according to his or her judgment, and the detailed meaning thereof is illustrated in the related part of the description herein. Furthermore, it is intended that the present application be understood not only by the actual terms used, but also by the meaning of each term.

The basic principles and preferred embodiments of the present application are discussed in more detail with reference to the accompanying drawings. First, as shown in FIG. 1, an extension module 10 for independently storing calibration data of the present invention mainly includes: a first interface 101, a second interface 102, a signal processing circuit 103, and a first memory 104.

The first interface 101 is adapted to receive a first external input signal (Vi). The second interface 102 is adapted to output a first output signal (Vo) of the extension module 10. The signal processing circuit 103 is connected between the first interface 101 and the second interface 102. For example, in the embodiment shown in FIG. 1, the signal processing circuit 103 is constituted by an operational amplifier (OPA) and a port protection circuit, but the present invention is not limited thereto. The first memory 104 may be, for example, an electrically erasable read only memory (EEPROM). Preferably, an EEPROM having an 11AA010T chip from Microchip may be used, which has only three PINs namely VCC, GND, and I2C communication, so that the communication between the main module and the EEPROM on the extension module is achieved by using just one line. According to the present invention, the first memory 104 stores first calibration data associated with the extension module 10. As a preferred embodiment, the first calibration data is only associated with the extension module 10 and is independent of the main module connected to the extension module 10. For example, the first calibration data includes at least a gain of the extension module 10 and an offset of the extension module 10. In this way, the extension module can be allowed to be butted with the main module without repeated calibration. The advantages of the above technical solutions will become more apparent in the following description in connection with the main module.

FIG. 1 shows a component composed of the extension module 10 and the main module 20. In addition to the extension module 10 discussed above, the main module 20 in the component mainly includes a third interface 201, a second memory 202, and a controller 203.

The third interface 201 is adapted to be butted with the second interface 102 of the extension module 10 to receive the first output signal (Vo) from the extension module 10. The second memory 202 stores second calibration data associated with the main module. Preferably, the second calibration data is only associated with the main module 20 and is independent of the extension module connected to the main module 20. Similar to the first calibration data, the second calibration data includes at least a gain of the main module 20 and an offset of the main module 20. The controller 203, such as an MCU, is adapted to communicate with the first memory 104 of the extension module 10, for example by way of communication such as I²C or SPI, to read the first calibration data described above. As an example, a fifth interface may be added to the main module 20, and a sixth interface corresponding to the fifth interface may be added to the extension module 10. The controller 203 communicates with the first memory 104 of the extension module 10 on the basis of an I²C or SPI communication protocol via the fifth interface and the sixth interface. The component of the present invention uses a solution of separately storing the calibration data of the main module and the extension module.

In the component shown in FIG. 1, the main module 20 may be further provided with an ADC sampling circuit 204. In the solution according to the present invention, the ADC sampling circuit 204 is shared by the main module 20 and the extension module 10. That is, the ADC sampling circuit structure may be omitted in the extension module 10, and only the signal processing and port protection circuits are retained, so as to reduce the cost.

In addition, the main module 20 may further include a fourth interface 205 adapted to receive a second external input signal (e.g., an analog signal) and a multiplexer 206 connected between the ADC sampling circuit 204 and the third and fourth interfaces 201 and 205.

Hereinafter, the operation principle of the component of the present invention will be discussed in detail based on the structure of the component shown in FIG. 1. As a premise, a conversion relationship between input signals and output signals of the main module 20 and the extension module 10 in the present application is linear. The following takes an input signal as voltage as an example:

A relation from input to output on the extension module 10 is as follows:

$$Vo = Gain1 * Vi + Offset1,$$

where Vo is an output voltage of the extension module 10 (the above first output signal), Vi is an input voltage of the extension module 10 (the above first input signal), Gain1 is the gain of the extension module 10, and Offset1 is the offset of the extension module 10. As discussed above, Gain1 and Offset1 are stored as first calibration data in the first memory 104 of the extension module 10.

A relation from input to output on the main module 20 is as follows:

$$ADC\_Code = Gain2 * Vo + Offset2,$$

where ADC_Code is a digital code value of a final conversion of an analog-to-digital conversion (ADC) circuit, Gain2 is the gain of the main module 20, and Offset2 is the offset of the main module 20. As discussed above, Gain2 and Offset2 are stored as second calibration data in the second memory 202 of the main module 20.

Then the total conversion relationship of the components is:

$$ADC\_Code = Gain1 * Gain2 * Vi + Offset1 * Gain2 + Offset2;$$

let gain=Gain1*Gain2, offset=Offset1*Gain2+Offset2, then ADC_Code=gain*Vi+offset.

That is, the third calibration data of the component may be obtained by the total conversion relationship. The third calibration data includes a total gain and a total offset, where the total gain is a product of the gain of the extension module and the gain of the main module, and the total offset is the sum of a product of the offset of the extension module and the gain of the main module and the offset of the main module.

Based on the above conversion relationship, the third calibration data of the component is allowed to be obtained by the first calibration data stored in the first memory 104 of the extension module 10 and the second calibration data stored in the second memory 202 of the main module 20. Since the first calibration data is only relevant to the extension module 10 and the second calibration data is only relevant to the main module 20, the connection of different extension modules 10 and the main module 20 is allowed. In addition, the solution does not need repeated calibration, and only needs to perform an operation after the main module and the extension module are butted to obtain the total calibration data of the component.

One embodiment of a component calibration method 300 according to the present application is discussed in detail below in conjunction with FIG. 2. The component calibration method 300 mainly includes the following steps:

Step S301: Read, by a controller of a main module, first calibration data stored in a first memory on an extension module when a component formed by connecting the main module and the extension module to each other is powered on, where the first calibration data is associated with the extension module.

Step S302: Read, by the controller of the main module, second calibration data stored in a second memory on the main module, where the second calibration data is associated with the main module.

Step S303: Combine the first calibration data and the second calibration data to form third calibration data.

Step S304: Store the third calibration data on the main module as calibration data of the component.

The above step S301 may be performed every time the component is powered on, so that the main module 20 reads the calibration data in the first memory on the extension module 10, combines the two parts of calibration data to generate third calibration data, stores the new third calibration data on the main module, and then participates in the operation with it. It should be noted that the present invention does not limit the order of step S301 and step S302.

In summary, the above technical solution of the present invention allows a customer to freely mix the main module and the extension module, so that a requirement on low cost is met.

It will be apparent to those skilled in the art that various modifications and transformations can be made in the above example embodiments of the present application without departing from the spirit and scope of the present invention. Therefore, it is intended that the present application will cover the modifications and transformations of the present application falling within the scope of the appended claims and equivalent technical solutions.

What is claimed is:

1. An extension module for independently storing calibration data, the extension module comprising:
    a first interface configured to receive a first external input signal;
    a second interface configured to output a first output signal of the extension module;
    a signal processing circuit connected between the first interface and the second interface; and
    a first memory storing first calibration data, the first calibration data including at least a gain of the extension module and an offset of the extension module.

2. The extension module of claim 1, wherein a conversion relationship between the first input signal and the first output signal of the extension module is linear.

3. A component, comprising:
    an extension module, the extension module including
        a first interface configured to receive a first external input signal,
        a second interface configured to output a first output signal of the extension module,
        a signal processing circuit connected between the first interface and the second interface, and
        a first memory storing first calibration data, the first calibration data being associated with the extension module; and
    a main module including
        a third interface configured to be butted with the second interface,
        a second memory storing second calibration data, the second calibration data being associated with the main module, and
        a controller configured to communicate with the first memory to read the first calibration data.

4. The component of claim 3, wherein the main module further includes an ADC sampling circuit, and wherein the ADC sampling circuit is configured to be shared by the main module and the extension module.

5. The component of claim 3, wherein the second calibration data includes at least a gain of the main module and an offset of the main module.

6. The component of claim 3, wherein the main module further includes a fourth interface configured to receive a second external input signal.

7. The component of claim 3, wherein a conversion relationship between input signals and output signals of the main module and the extension module is linear.

8. The component of claim 3, wherein
    the main module further includes a fourth interface,
    the extension module further includes a fifth interface corresponding to the fourth interface, and
    the controller is configured to communicate with the first memory of the extension module based upon at least one of an I²C communication protocol or a SPI communication protocol via the fourth interface and the fifth interface.

9. The component of claim 6, wherein a conversion relationship between input signals and output signals of the main module and the extension module is linear.

10. The component of claim 9, wherein the main module includes a fifth interface, and the extension module includes a sixth interface corresponding to the fifth interface, the method further comprising:
    communicating, by the controller with the first memory of the extension module based upon at least one of an I²C communication protocol or a SPI communication protocol via the fifth interface and the sixth interface.

11. A component calibration method for a component including a main module connected to an extension module, the component calibration method comprising:
- reading, by a controller of the main module, first calibration data stored in a first memory on the extension module in response to the component being powered on, the first calibration data being associated with the extension module;
- reading, by the controller of the main module, second calibration data stored in a second memory on the main module, the second calibration data being associated with the main module;
- combining the first calibration data and the second calibration data to form third calibration data; and
- storing the third calibration data on the main module as calibration data of the component.

12. The component calibration method of claim 11, wherein the first calibration data includes at least a gain of the extension module and an offset of the extension module, and the second calibration data includes at least a gain of the main module and an offset of the main module.

13. The component calibration method of claim 11, wherein a conversion relationship between input signals and output signals of the main module and the extension module is linear.

14. The component calibration method of claim 12, wherein the third calibration data includes a total gain and a total offset, the total gain being a product of the gain of the extension module and the gain of the main module, and the total offset being a sum of a product of the offset of the extension module and the gain of the main module and the offset of the main module.

15. The component calibration method of claim 12, wherein a conversion relationship between input signals and output signals of the main module and the extension module is linear.

16. The component calibration method of claim 14, wherein a conversion relationship between input signals and output signals of the main module and the extension module is linear.

* * * * *